Figure 1:
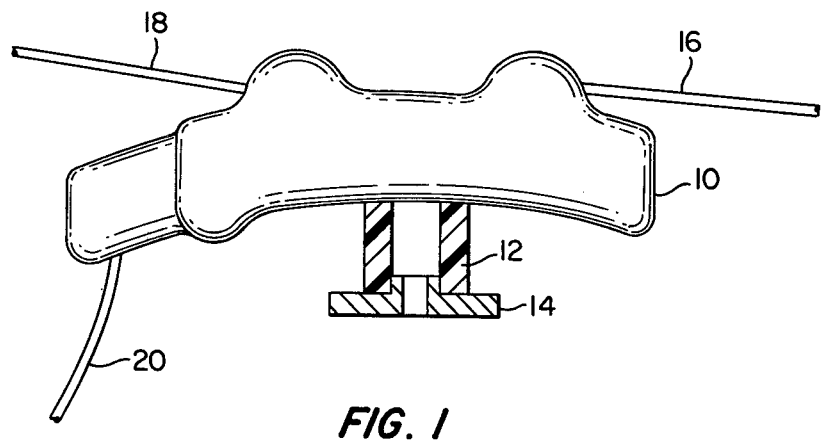

United States Patent [19]

Scriffignana et al.

[11] 4,312,131

[45] Jan. 26, 1982

[54] ACCURATE LEVEL SENSOR

[75] Inventors: Peter J. Scriffignana, Newark; Theodore T. Hadeler, Montvale, both of N.J.

[73] Assignee: The Bendix Corporation, Teterboro, N.J.

[21] Appl. No.: 86,865

[22] Filed: Oct. 22, 1979

[51] Int. Cl.³ .............................................. G01C 9/26
[52] U.S. Cl. ...................................... 33/350; 33/366
[58] Field of Search ................. 33/344, 366; 200/293, 200/301, 302, 215, 216, 220, 236, 61.52, 52 A

[56] References Cited

U.S. PATENT DOCUMENTS

| | | | |
|---|---|---|---|
| 3,267,247 | 8/1966 | Ross | 200/302 |
| 3,335,246 | 8/1967 | Romanowski | 200/216 |
| 4,163,127 | 7/1979 | Herou | 200/302 X |

Primary Examiner—Charles E. Phillips
Attorney, Agent, or Firm—Anthony F. Cuoco; Vett Parsigian

[57] ABSTRACT

An accurate level sensor having an electrolytic switch 10 is mounted within a chamber 22 on a thermally insulating member 12 and is surrounded by a thermally insulating air space 23. Chamber 22 is mounted within a chamber 24 by thermally insulating members 38 and is surrounded by a thermally insulating air space 25. Chamber 24 is mounted to an inertial reference member 44 by thermally insulating members 46. All mounting surfaces are precisely parallel to each other and sensitivity to ambient temperature conditions is attenuated to provide a sensor for maintaining the inertial reference member level and stable within a high degree of accuracy.

Figure 4:
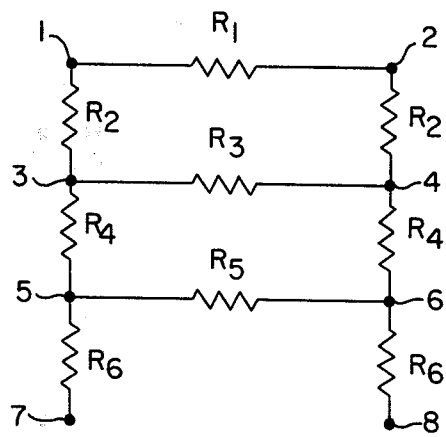

7 Claims, 4 Drawing Figures 4,312,131

ACCURATE LEVEL SENSOR

The present invention relates to level sensors of the type used, for example, for maintaining an inertial reference member (stable reference platform gimbal) level, and stable about its roll and elevation axes within a high degree of accuracy. More particularly, this invention relates to a level sensor using an electrolytic switch which is accurately supported in relation to the stable reference platform gimbal and which has attenuated thermal sensitivity characteristics.

A level sensor including an electrolytic switch (a gravity type switch such as that referred to in the art as a "bubble switch") is desirable for the purposes described since this type switch has a high sensitivity, is low in cost, and is highly reliable in the absence of moving parts. Although the electrolytic switch is capable of maintaining almost constant null voltage under steady state temperature conditions, it is extremely sensitive to ambient temperature conditions.

In the prior art, the electrolytic switch has been mounted directly to the stable reference platform gimbal and no particular accommodations have been made for the thermal sensitivity of the switch. This is a disadvantage in inertial guidance applications which require that a high degree of leveling and stabilizing accuracy be maintained.

The present invention overcomes the disadvantages of the prior art by accurately mounting the switch within a housing and accurately mounting the housing to the stable reference platform gimbal. The housing is arranged to thermally insulate the switch from ambient temperature changes.

In a preferred embodiment of the invention, the level sensor features a housing having two chambers, one inside the other, and separated each from the other by thermally insulating supports and air spaces. The electroltyic or gravity type switch is accurately mounted within the inner chamber on a thermally insulating support. The inner chamber is accurately mounted within the outer chamber on thermally insulating supports and the outer chamber is mounted to the stable reference platform gimbal on thermally insulating supports.

All mounting surfaces are in precise parallel relation (0.0001 inches) to each other.

The arrangement of the present invention is capable of maintaining the stable reference platform gimbal level and stable about its sensitive axes within a high degree of accuracy.

Figure 2:
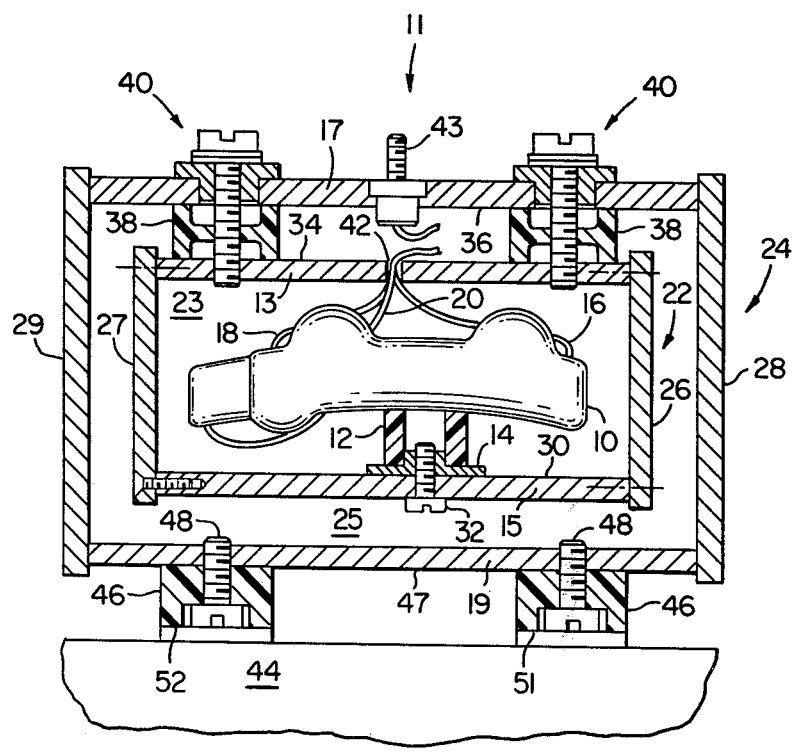
Figure 3:
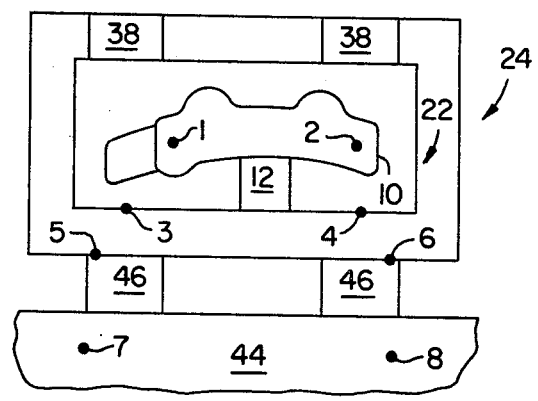

The invention will now be described by way of example with reference to the accompanying drawings in which:

FIG. 1 is a partially sectioned diagrammatic plan view of an electrolytic switch and switch support means in accordance with the invention, FIG. 2 is a partially sectioned diagrammatic plan view of a level sensor in accordance with the invention, FIG. 3 is a line diagram of the level sensor shown in FIG. 2 and showing temperature nodes at specific locations of the sensor, FIG. 4 is a representation of a thermal circuit for the sensor of FIGS. 2 and 3 and showing temperature nodes corresponding to like numbered nodes in FIG. 3.

FIG. 1 shows an electrolytic switch designated by the numeral 10. Switch 10 is of the conventional type ("bubble switch") such as manufactured by Spectron Glass and Electronics, Inc., Hempstead, N.Y., and following Military Procurement Specification MIS 30013.

Switch 10 is cemented on a post 12, which may be of a glass bonded mica or similar material, with epoxy cement or the like. A metallic base 14 is cemented to the bottom of the post with epoxy cement or the like. Switch 10 is level within, for example, ±2 minutes of arc relative to base 14.

Leads 16, 18 and 20 extend from the switch for appropriate electrical connections as will be understood by those skilled in the art.

FIG. 2 shows a housing designated generally by the numeral 11 and including an inner chamber designated generally by the numeral 22 and an outer chamber designated generally by the numeral 24. Chamber 22 includes top and bottom walls 13 and 15 and side walls (not shown). The chamber is formed of thermally conductive, square extruded aluminum tubing or the like. A pair of end plates 26 and 27 are mounted to opposite ends of the top and bottom walls through screws or the like to close the chamber. Chamber 24 includes top and bottom plates 17 and 19 and side walls (not shown). The chamber likewise is formed of thermally conductive, square extruded aluminum tubing. A pair of end plates 28 and 29 are mounted to opposite ends of the top and bottom walls through screws or the like to close the chamber.

Switch support base 14 is mounted to an inner chamber inner mounting surface 30 on bottom wall 15 by a screw 32. Chamber 22 has an outer mounting surface 34 on top wall 13. Inner mounting surface 30 and outer mounting surface 34 are machined to be precisely parallel to each other.

Inner chamber 22 is suspended from an inner mounting surface 36 on top wall 17 of outer chamber 24. Mounting surface 34 of inner chamber 22 and mounting surface 36 of outer chamber 24 are machined to be precisely parallel to each other.

A pair of glass bonded mica spacers 38 are disposed between mounting surfaces 34 and 36. Screw assemblies 40 extend through walls 17 and 13 and spacers 38 to secure chambers 22 and 24 to each other. Spacers 38 are machined as a matched set to preserve the aforenoted level alignment of switch 10 within inner chamber 22.

With the arrangement shown, the air space 23 within inner chamber 22 and the air space 25 separating inner chamber 22 and outer chamber 24 have a thermally insulating affect on sensor switch 10 as will now be understood by those skilled in the art.

Electrical connectors 16, 18 and 20, leading from switch 10 through an aperture 42 in top plate 13 of inner chamber 22, are soldered to separate terminals 43 (one of which is shown) in top wall 17 of outer chamber 24 and the terminal connections are sealed with a silicon compound as is well known in the art.

Outer chamber 24 is mounted to, for example, a stable reference platform elevation gimbal 44. Glass bonded mica mouting supports 46 are secured to an outer mounting surface 47 on wall 19 through screws 48. The mounting supports are secured to gimbal 44 through screws (not shown) and are machined as a matched set to maintain the aforenoted level alignment of switch 10. Surface 47 is machined to be precisely parallel to surface 36 on wall 17, and hence precisely parallel to surface 34 on wall 13 and to surface 30 on wall 15.

In this connection it is noted that after assembly of the level sensor as shown in FIG. 2, tolerance build-up may result in the required level alignment of switch 10 not being maintained. In this event, the mounting surfaces 51 of mounting supports 46, respectively, are lapped or otherwise machined to achieve the required level alignment.

The glass bonded mica support members heretofore referred to may be of a ceramoplastic material such as marketed by Moleculor Dielectrics, Inc., Clifton, N.J., under their tradename MYKROY and following Military Procurement Specification MIL-1-10A, Grade L443. This material has relatively low thermal conductivity and thermal expansion characteristics, and is hence suitable for the purposes intended.

The level sensor described with reference to FIGS. 1 and 2 provides the thermal attenuation required to prevent excessive error signals from switch 10 due to external thermal disturbances. The basic approach is to provide both isolation from the environment by means of high thermal resistance air gaps (23 and 25) and insulators (12, 38, 46) to attenuate ambient temperature gradients, and highly conductive heat transfer members (22, 24) along the length of switch 10 to equalize the attenuated ambient temperature gradients that penetrate the housing structure.

FIG. 3 is a line diagram of the level sensor illustrated and particularly described with reference to FIGS. 1 and 2, FIG. 3 shows temperature nodes at specific locations of the sensor, and which temperature nodes carry the numerical designations 1 through 8.

FIG. 4 shows a thermal circuit for the level sensor, with temperature nodes numbered to correspond to like numbered nodes in FIG. 3. The odd numbered resistances ($R_1$, $R_3$, $R_5$) in the thermal circuit are for the highly conductive length-wise paths, while the even numbered resistances ($R_2$, $R_4$, $R_6$) are for the insulating air gaps between the inner and outer chambers and the support members as illustrated in FIGS. 2 and 3.

A mathematical analysis of the thermal circuit shown in FIG. 4, with continued reference to FIG. 3, yields the following equation for thermal attenuation factor n:

$$\eta = \frac{\beta}{\beta_0} = \frac{1}{\left(1 + 2\frac{R_2}{R_1}\right)\left(1 + 2\frac{R_4}{R_X}\right)\left(1 + 2\frac{R_6}{R_Y}\right)} \quad (1)$$

Where:
$\beta = (T_2 - T_1) =$ switch 10 end-to-end temperature difference (°C.)
$\beta_0 = (T_8 - T_7) =$ External mount temperature difference (°C.)

$$R_X = \left[\frac{R_3}{1 + \frac{R_3}{R_1 + 2R_2}}\right]$$

$$R_Y = \left[\frac{R_5}{1 + \frac{R_5}{R_X + 2R_4}}\right]$$

$R_1$, $R_3$, $R_5 =$ lengthwise conductors
$R_2$, $R_4$, $R_6 =$ insulation resistances For the level sensor herein described, the value of attenuation factor n is of sufficient magnitude to provide the aforenoted accuracy.

It will now be seen from the aforegoing description of the invention that a level sensor has been provided which uses an electrolytic switch that is accurately supported and which has attenuated thermal sensitivity characteristics to satisfy the aforegoing purposes of the invention. Other objects and advantages of the present invention will now be apparent to those skilled in the art in view of the aforegoing description.

What is claimed is:

1. A level sensor of the type for maintaining an inertial reference member level and stable about its axes, comprising:
a gravity type electrolytic switch including a sealed vial containing electrolytic fluid and electrical contacts;
a first chamber structure for containing the gravity type switch;
first means for mounting the switch within the first chamber structure including a thermally insulating post mounted to the switch, a base mounted to the post, the first chamber structure having a first surface for supporting the base, and means for mounting the base supported by the first surface to said surface;
a second chamber structure containing the first chamber structure;
second means for mounting the first chamber structure within the second chamber structure including the first chamber structure having a second surface, the second chamber structure having a first surface, a pair of thermally insulating spacers disposed between the second surface of the first chamber structure and the first surface of the second chamber structure, and means for mounting the first and second chamber structures separated by the thermally insulating spacers to each other;
third means for mounting the second chamber structure to the inertial reference member including the second chamber structure having a second surface, a pair of thermally insulating support members disposed between the second surface of the second chamber structure and the inertial reference member, means for mounting the support members to the second surface of the second member, and means for mounting the support members to the inertial reference member;
the switch in the first chamber structure being surrounded by a first air space;
a first chamber structure in the second chamber structure being surrounded by a second air space; and
the first, second and third mounting means and the first and second air spaces are thermally insulating for attenuating ambient temperature gradients affecting the switch.

2. A level sensor as described by claim 1, wherein:
the first and second chamber structures are thermally conductive for equalizing the attenuated temperature gradients affecting the switch.

3. A level sensor as described by claim 1, wherein:
the switch is precisely level relative to the base.

4. A level sensor as described by claim 1, wherein:
the first surface of the first chamber structure and the second surface of the first chamber structure are precisely parallel to each other; and the second surface of the first chamber structure and the first surface of the second chamber structure are precisely parallel to each other.

5. A level sensor as described by claim 1, wherein:
the second surface of the second chamber structure is precisely parallel to the first surface of the second chamber structure and precisely parallel to the first and second surfaces of the first chamber structure.

6. A level sensor as described by claim 1, wherein the first chamber structure includes:
top and bottom plates;
an end plate mounted to corresponding ends of the top and bottom plates and another end plate mounted to opposite corresponding ends of the top and bottom plates to close the chamber and to provide the first air space;
the first surface of the first chamber structure is on the inner surface of the bottom plate; and
the second surface of the first chamber structure is on the outer surface of the top end plate.

7. A level sensor as described by claim 1, wherein the second chamber structure includes:
top and bottom plates;
an end plate mounted to corresponding ends of the top and bottom plates and another end plate mounted to opposite corresponding ends of the top and bottom plates to close the chamber and to provide the second air space;
the first surface of the second chamber structure is on the inner surface of the top plate; and
the second surface of the second chamber structure is on the outer surface of the bottom plate.

* * * * *